(12) United States Patent
Kent et al.

(10) Patent No.: US 7,483,142 B2
(45) Date of Patent: Jan. 27, 2009

(54) SECURITY SYSTEMS AND MONITORING METHODS USING QUANTUM STATES

(75) Inventors: Adrian Kent, Cambridge (GB); William J. Munro, Bristol (GB); Timothy P. Spiller, Bristol (GB); Raymond G. Beausoleil, Jr., Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 351 days.

(21) Appl. No.: 11/417,614

(22) Filed: May 3, 2006

(65) Prior Publication Data

US 2007/0257201 A1 Nov. 8, 2007

(51) Int. Cl.
*G01B 9/02* (2006.01)
(52) U.S. Cl. ...................................... 356/450

(58) Field of Classification Search .................. 356/450
See application file for complete search history.

(56) References Cited

U.S. PATENT DOCUMENTS

| 7,362,420 | B2* | 4/2008 | Zaugg | 356/5.01 |
| 2004/0095582 | A1* | 5/2004 | Holbrook | 356/491 |
| 2007/0177735 | A1* | 8/2007 | Mimih et al. | 380/256 |
| 2007/0215862 | A1* | 9/2007 | Beausoleil et al. | 257/31 |
| 2008/0107273 | A1* | 5/2008 | Munro et al. | 380/278 |

\* cited by examiner

*Primary Examiner*—Patrick J Connolly

(57) ABSTRACT

A security system uses a source capable of producing an entangled state of a sensing mode and a reference mode. The sensing mode has a path that enters an area around an object being secured. A state measurement system in the security system can measure a combination of the sensing mode after traversal of the sensing path and the reference mode after traversal of a reference path.

15 Claims, 3 Drawing Sheets

SECURITY SYSTEMS AND MONITORING METHODS USING QUANTUM STATES

BACKGROUND

Museums and other facilities that keep valuable objects often need security systems that can detect intruders and/or detect tampering with the valuable objects. A variety of systems have been developed to serve these needs. For example, pressure plates can be placed around and/or under the object to detect the weight of an intruder or movement of the object. Other security systems have used webs of light beams and sensors that can detect when an intruder interrupts the web. These security systems often require a secure area that contains at least some system components to prevent an intruder from directly tampering with the system components, even though the object being protected by the web of beams is outside the secure area. Although such systems can be very secure, these security systems are at least theoretically susceptible to being evaded. For example, an intruder may be able to evade a web of light beams by intercepting and replacing security system light beams with light signals that mimic or carry the same information as intercepted light beams.

BRIEF DESCRIPTION OF THE DRAWINGS

Use of the same reference symbols in different figures indicates similar or identical items.

DETAILED DESCRIPTION

In accordance with an aspect of the current invention, a security system can employ a quantum interferometer to ensure that a sensing beam cannot be interrupted, deflected, or tampered with without detection. Interference between or among the entangled quantum states of two or more beams can be established with at least one beam providing intrusion sensing (e.g., by being at a boundary of a monitored area) and at least one other beam remaining within a secure area. Some of the system components such as a beam source, beam splitters, and detectors used in the security system can also be in the secure area. Disturbances of the sensing beam or beams will disturb quantum interference with the other beam or beams, reduce coherence of the overall quantum state, and provide a measurable signal marking the disturbances.

Figure 1:
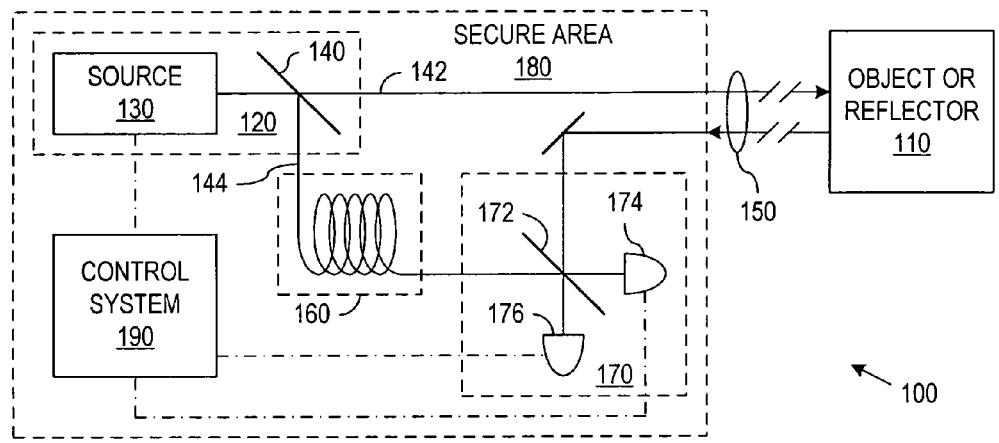
FIG. 1 is a schematic of a security system in accordance with an embodiment of the invention using a Mach-Zehnder interferometer for intrusion detection.

FIG. 1 shows a security system 100 in accordance with an embodiment of the invention that uses entangled states and measurable quantum interference to detect tampering with an object 110. As shown, security system 100 includes a photon source 120 and a quantum state measurement system 170 that are in a secure area 180. Photon source 120 has output modes 142 and 144, sometimes referred to herein as sensing mode 142 and reference mode 144. In operation, photon source 120 produces a known entangled state of modes 142 and 144, and in one specific embodiment, the known entangled state corresponds to a single photon pulse having a state that is "split" between modes 142 and 144. Mode 142 extends along a sensing path 150 out of secure area 180 to object 110, back into secure area 180 and quantum state measurement system 170. Mode 144 reaches measurement system 170 by way of a reference path 160 that is within secure area 180. Measurement in quantum state measurement system 170 can detect motion of object 110 or changes in sensing path 150 through measurement and/or statistical analysis of the interference of the states of modes 142 and 144 at system 170 in secure area 180.

In the illustrated embodiment of FIG. 1, photon source 120 uses a single-photon source 130 and a 50-50 beam splitter 140 to produce the entangled state of modes 142 and 144. In particular, single-photon source 130 operates by periodically producing a single photon that is in a state $|1\rangle$ known to contain a single photon within a characteristic time/space envelope. The 50-50 beam splitter 140 operates on the single-photon state to produce an entangled state of modes 142 and 144 as described further below.

Suitable sources for single-photon states are described, for example, by Kok et al., "Linear Optical Quantum Computing," arXiv:quant-ph/0512071 (2005). The rate and timing of production of separate photons from source 130 are preferably random or unpredictable but can be reported to or controlled by a control system 190 in secure area 180. For example, source 130 can produce a series of single photons at random times and a non-absorbing photon detector (not shown) can detect the times when photons from source 130 pass through the non-absorbing detector. Some examples of suitable non-absorbing detectors are described by Munro et al., "A High-Efficiency Quantum Non-Demolition Single Photon Number Resolving Detector", Phys. Rev. A 71, 033819 (2005).

The 50/50 beam splitter 140, which is in the path of photons emitted from source 130, has modes 142 and 144 as output modes. In an exemplary embodiment of the invention where source 130 produces a single-photon state $|1\rangle$, beam splitter 140 creates a state $$\frac{1}{\sqrt{2}}\{|1\rangle_S|0\rangle_R + |0\rangle_S|1\rangle_R\},$$

where states $|0\rangle_S$ and $|1\rangle_S$ respectively corresponds to states with 0 and 1 photon in sensing mode 142 and states $|0\rangle_R$ and $|1\rangle_R$ respectively corresponds to states with 0 and 1 photon in reference mode 144.

Mode 142 from beam splitter 140, as noted above, corresponds to a sensing beam that exits and returns to secure area 180 along sensing path 150. In the illustrated embodiment, sensing path 150 leads to object 110, where a reflector system on object 110 reflects photons back toward secure area 180. As will be appreciated by those of skill in the art, this configuration is merely one example of use of a sensing beam in a security system, and many other configurations are possible, including but not limited to directing the sensing beam through object 110, routing a sensing beam in a path that defines a monitored area that contains object 110, and using the sensing beam as one of many beams that together form a web surrounding object 110 and the monitored area.

The sensing beam when returned to secure area 180 is a first input beam to quantum state measurement system 170. Mode 144 from beam splitter 140 provides the reference beam, which reaches a second input of quantum state measurement system 170 after traversing reference path 160. Reference path 160, which may include a delay line implemented, for example, using optical fibers, can be adjusted or tuned according to the optical path length of the sensing beam. As a result, the reference beam preferably reaches system 170 at a time and with a phase having known relationships to the arrival and phase of the sensing beam at system 170. In an exemplary embodiment, which is assumed for the following, reference path 160 and sensing path 150 are adjusted to have the same optical path lengths. With this exemplary configuration, the input state for system 170 will effectively be same as the state that source 120 produced, e.g., the state $$\frac{1}{\sqrt{2}}\{|1\rangle_S|0\rangle_R + |0\rangle_S|1\rangle_R\}$$

is input to system 170 in the exemplary embodiment described above. System 170 then measures the input quantum state and can detect tampering if the measurement result statistically differs from predicted measurement results.

Quantum state measurement system 170 in the illustrated embodiment is a Mach-Zehnder interferometer including a 50-50 beam splitter 172, a first photon detector 174, and a second photon detector 174. Other types of quantum interferometers or other configurations Mach-Zehnder interferometers could alternatively be used. The sensing and reference beams in the illustrated configuration combine on 50-50 beam splitter 172 and interfere according to the timing and/or phase difference introduced by optical elements (e.g., beam splitters 140 and 172) and by paths 150 and 160. In particular, the exemplary configuration of security system 100 can be selected so that interference of the reference and sensing beams results in a nearly 100% probability the photon entering one detector 174 or 176 and a nearly 0% probability of the photon entering the other detector 176 or 174. As an illustrative example, security system 100 can be configured so that detector 174 is at a bright port and detects a photon each time source 130 emits a photon, and detector 176 is at a dark port that (ignoring errors and changes in path 150) should never detect photons. If path 150 or the state of mode 142 is altered by, for example, by an intruder moving object 110 or inserting a reflector system that changes the length of sensing path 140, the input state to system 170 will change causing detector 176 to detect at least some photons while detector 174 misses detecting expected photons.

An intruder tampering with the sensing beam in the exemplary embodiment where source 120 produces a single photon state will introduce a timing mismatch in arrivals of the component states corresponding to modes 142 and 144. As a result, the incident state reaching measurement system 170 will be a state $|\psi_T\rangle$ given in Equation 1, where $\tau$ is the change in the propagation time caused by the tampering and $\tau_C$ is the coherence time of the photon state. In general, time $\tau$ is equal to the change $\Delta L$ in the optical path length of sensing mode 142 divided by the speed of light c. If the change $r\tau=\Delta L/c$ in the transmission time is greater than the coherence time $\tau_C$ of the single photon state, no interference will result at beam splitter 174, and each detector 174 or 176 will detect the photon half the time. If change $\tau$ is less than the coherence time $\tau_C$ of the single photon state, the probability P of photons appearing at the dark port is given in Equation 2, so that the probability of detecting photons from the dark port of beam splitter 172 goes to zero as the delay goes to zero. When propagation time change $\tau$ is much less than coherence time $\tau_C$, the dependence of probability P on the change in propagation time $\tau$ simplifies, i.e., $P \rightarrow |\tau|^2/4\tau_C^2$.

Equation 1:

$$|\psi_T\rangle = \frac{1}{\sqrt{1+e^{-2\tau/\tau_C}}}\left\{e^{-\frac{|\tau|}{\tau_C}}|1\rangle_S|0\rangle_R + |0\rangle_S|1\rangle_R\right\}$$

Equation 2:

$$P = \frac{1}{2} \cdot \frac{(1-e^{-|\tau/\tau_C|})^2}{1+e^{-2|\tau/\tau_C|}}$$

A short coherence time $\tau_C$ is generally desired to maximize the detection rates in the dark port. For example, a coherence time $\tau_C$ of about 10 ps can provide 10% probability of dark port photon counts for a path change $\Delta L$ of about 0.2 mm. With a high rate of transmitted photons passing through the system, a 10% probability will cause the dark port detector to fire rapidly, signaling an intrusion. More generally, coherence times achievable with current technology could be between an attosecond and milliseconds. Control system 190 can analyze the dark port counts for a series of photon emitted from source 130 and generate an alarm signal when the dark port count rate is above a threshold or background error level for system 100.

The rate at which source 130 produces single photons may be as high as possible provided that detectors 174 and 176 are able to distinguish consecutive photon pulses. For example, with each detector 174 or 176 capable of detecting a photon in a 5-10 ns window, system 100 can process distinct dark and light port photon counts when source 130 can produce photons at a rate of about 1 photon every 10-20 ns. The high photon rate permits statistically significant detection of relatively low probability dark counts for detection of tampering that only causes small changes $\Delta L$ in the optical path length of mode 144. However, lower photon rates could also successfully detect tampering.

System 100 has an advantage when compared to classical security systems using light beams in that the quantum entanglement of modes 142 and 144 prevents interception and replacement of sensing mode 142. In particular, an intruder cannot access reference mode 144 in secure area 180, and tampering with or replacing accessible mode 142 affects the entangled mode 144. A key quantum principle here is that replacing part of the entangled state with a replacement part will cause a loss of the coherence with the remaining part of the original entangled state, which will then cause photons to leak out of the dark port. In contrast, if source 130 produced a low power coherent state $|\alpha\rangle$, beam splitter 140 would create a separable state $|\alpha/2\rangle_S|\alpha/2\rangle_R$ and an intruder might be able to undetectably replace the accessible state $|\alpha/2\rangle_S$ with a matching coherent state. With a superposition/entangled state as in system 100, the laws of quantum mechanics forbid undetectable replacement of part of the entangled state.

One possible attack on security system 100 is sometimes referred to herein as a teleportation attack. A teleportation attack on system 100 could use quantum teleportation to transfer the unknown state of sensing mode 142 to a replacement photon state that is returned to secure area 180 in place of the original sensing mode state. An intruder could thus interrupt or tamper with sensing mode 142 if intruder can successfully teleport quantum information to the replacement state and have the replacement state arrive in secure area 180 at the correct time. However, system 100 can minimize the chance of an intruder succeeding in a teleportation attack. For example, system 100 can transmit photons at random or unpredictable times so that an intruder has timing problems for any teleportation attack, e.g., an intruder is unable to know when to produce an entangled photon pair for the quantum teleportation process. Also, quantum teleportation requires detection of a single photon and transmission of classical information. Such operations generally require more time than direct transmission of the photon on the sensing path to system 170, so that a teleportation attack can be detected through comparison to time of emission of a photon from source 130 and arrival of the photon at light port detector 174 and from timing overlap of modes 142 and 144 at interferometer 170.

The above description concentrated on the example of using an entangled state of a single photon on two paths 150 and 160, but alternative embodiments can employ other types of entangled states. For example, photon source 120 can instead produce entangled photon pairs. For example, photon source 120 can produce a singlet Bell state $|H\rangle_s|V\rangle_R - |V\rangle_s|H\rangle_R$ (unnormalized). Quantum state measurement system 170 will then receive Bell state $|H\rangle_s|V\rangle_R - |V\rangle_s|H\rangle_R$ if both paths 150 and 160 have the same optical path lengths, but system 170 receives a mixture of Bell states if sensing path 150 is altered. In this embodiment, system 170 can be a Bell state analyzer that detects whether the input state is Bell state $|H\rangle_s|V\rangle_R - |V\rangle_s|H\rangle_R$ or not.

Partial Bell state detection can be implemented in the illustrated embodiment of FIG. 1 if beam splitter 172 is a polarizing beam splitter that separates the H+V polarization from the H−V polarization. In this case, if the input state is the singlet Bell state $|H\rangle_s|V\rangle_R - |V\rangle_s|H\rangle_R$, both detectors 174 and 176 should detect a single photon at the same time. However, receipt of Bell state $|H\rangle_s|H\rangle_R + |V\rangle_s|V\rangle_R$ or $|H\rangle_s|H\rangle_R + |V\rangle_s|V\rangle_R$ at measurement system 170 causes photon bunching so that one of detectors 174 or 176 detects two photons when the other detector 176 or 174 detects none. Note that Bell state $|H\rangle_s|V\rangle_R - |V\rangle_s|H\rangle_R$ will not cause bunching, so that this embodiment of system 170 may be unable to distinguish two of the Bell states. However, tampering with object 110 or sensing path 150 will cause a non-zero probability of one detector 174 or 176 detecting two photons when the other detector 176 or 174 detects none, and even if detectors 174 and 176 are unable to distinguish 1 photon from 2 photons, the lack of coincident of detection events in detectors 174 and 176 will signal tampering.

Figure 2:
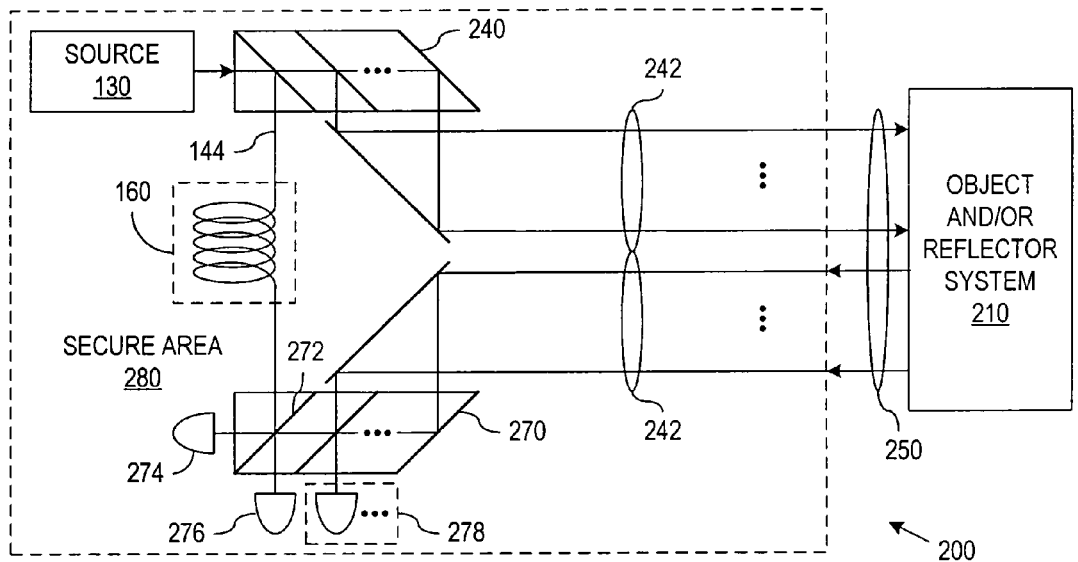
FIG. 2 shows a security system in accordance with an embodiment of the invention that splits a single-photon state into multiple sensing modes.

FIG. 2 illustrates an embodiment of a security system 200 that uses quantum interference and multiple entangled sensing beams. Security system 200 includes a photon source 130 and a multi-port beam splitter 240 providing more than one mode for photons directed out of a secure area 280. In illustrated embodiment, N sensing modes 242 reflect from an object 210 being monitored, but alternative paths for sensing modes 242 may be employed. The multiple sensing modes 242 upon return to secure area 180 are directed into a multi-port beam splitter 270 that recombines sensing modes 242 to interfere a combined beam with a reference beam 144 incident on a beam splitting surface 272 in beam splitter 270. Detectors 274 and 276 are positioned to measure light exiting from respective output ports associated with surface 272. Other detectors 278 can be positioned to detect light emitted from ports that are associated with other beam splitting surfaces in beam splitter 270. In an exemplary embodiment, the sensing paths of beams 242 and the path length of reference beam 144 are selected so that detector 274 corresponds to a bright port and detectors 274 or 276 correspond to dark ports. In this exemplary embodiment, detectors 276 and 278 will only receive photons if there was tampering with one or more of the sensing paths, and tampering can be detected from a statistically significant number of combined counts from detectors 276 and 278 or failures to receive counts at expected times in detector 274.

Figure 3:
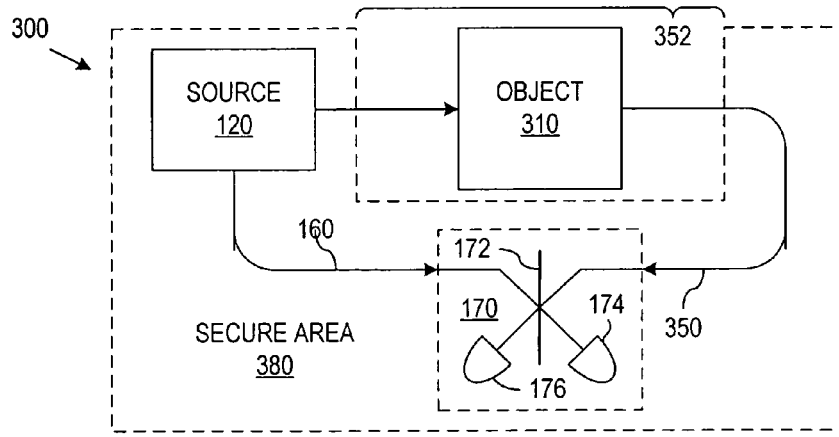
FIG. 3 shows a security system in accordance with an embodiment of the invention in which the accessible portion of a sensing beam follows a straight path.

FIG. 3 illustrates a security system 300 in accordance with an embodiment of the invention in which an accessible or insecure portion 352 of a sensing path 350 is straight and passes through the object 310 being protected. A secure area 380 of system 300 contains a source 120, a reference path 160, and a quantum state measurement system 170, which may be of the same types describe above. Secure area 380 further extends (e.g., halfway around object 310) so that the entire accessible portion 352 of sensing path 350 is straight. Any intruder alteration of portion 352 necessarily causes deviation from a straight line path and increases the path length of sensing path 350. System 300 can therefore detect the change in path 350 using a source 120 of entangled sensing and reference states and a quantum state measurement system 170 as described above. Further, system 300 can avoid the possibility of an intruder inserting an optical system that could reroute the sensing path 352 without changing the total path length.

Figure 4:
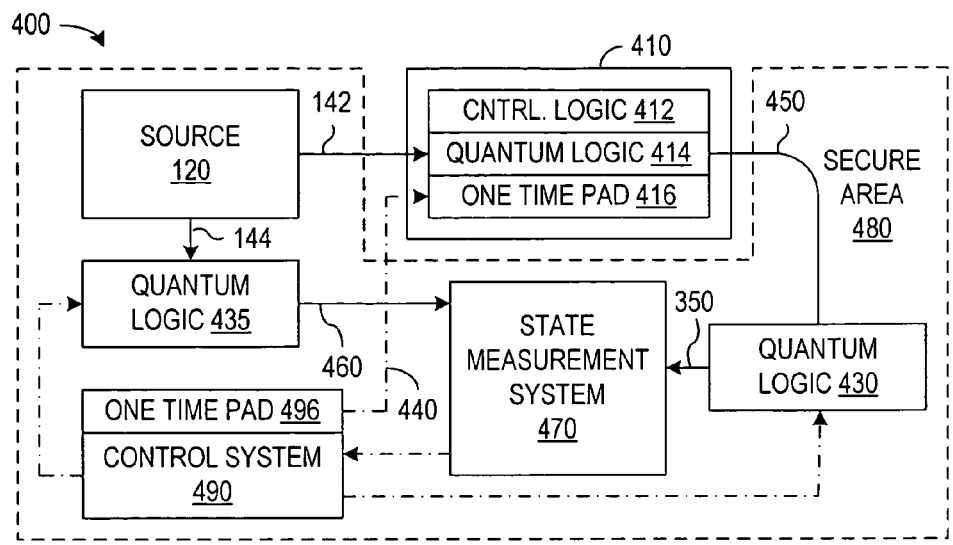
FIG. 4 shows a security system in accordance with an embodiment of the invention using quantum state modification at the object being secured.

FIG. 4 illustrates a security system 400 that protects an object 410 using quantum and classical security techniques. System 400 has a secure area 480 that includes a source 120 capable of creating an entangled state of a sensing mode 142 and a reference mode 144. Sensing mode 142 follows a sensing path 450 that outside secure area 480 may have an accessible portion that is straight to facilitate detection of deviations in the sensing path 450 as described above with reference to FIG. 3. In system 400, sensing path 450 passes through quantum logic 414 that is associated with (e.g., mounted on) object 410, reenters secure area 480, passes through additional quantum logic 430, and then enters a state measurement system 470. Reference mode 144 similarly has a reference path 460 that passes through quantum logic 435 on the way to measurement system 470. A delay line (not shown) may also be in reference path 460 or measurement path 450 to equalize the optical path lengths of reference path 460 and sensing path 450 from source 120 to measurement system 470.

Quantum logic 414, 430, and 435 preferably contain classically controlled quantum gates that can perform any of a set of different quantum coherent operations. Control logic 412 associated with object 410 provides classical signals that control which operations quantum logic 414 performs on sensing mode 142, and control system 490 in secure area 480 controls which operations quantum logic 430 and 435 respectively perform on sensing mode 142 and reference mode 144. In general, the type of quantum logic 414, 430, and 435 used will depend on the entangled state produced by source 120.

In one exemplary embodiment where source 120 produces a single photon state, quantum logic 435 is omitted, and quantum logic 430 performs the inverse of the operation that quantum logic 414 performs. In this case, logic 414 or 430 can perform one or more unitary operations such as bit flips, sign flips, photon number changes, and qubit re-encoding. In another embodiment, quantum logic 430 is omitted, and quantum logic 414 and 435 perform matching operations. For example, each of quantum logic 414 and 435 can be a controlled phase gate that shifts the phase of the traversing mode by an amount that a classical signal selects. Alternatively, each of quantum logic 414 and 430 can be controlled delays that delay respective modes by selected time intervals. Logic 414 and 430 may further include a set of converters that change the encoding of quantum information associated with sensing mode 142. Such converters, for example, may change the basis for encoding of a qubit represented by sensing mode from a photon number encoding to a polarization encoding, an angular momentum encoding, or a Schrödenger ket encoding.

A secure communication link 440 between control system 490 and control logic 412 can convey information such as copies 416 and 496 of a portion of a one time pad (OTP) that control system 490 and control logic 412 use to select the operations that quantum gates 414 and 430 perform. The OTP can be a random key of sufficient length for selection of operations without repetition or reuse of any portion of the OTP, and copies 416 and 496 may be periodically or continuously refreshed by transmissions between secure area 480 and object 410. Secure link 440 could use either classical or quantum security techniques such as QKD to avoid interception of the transmissions of portions of the one time pad.

Figure 5:
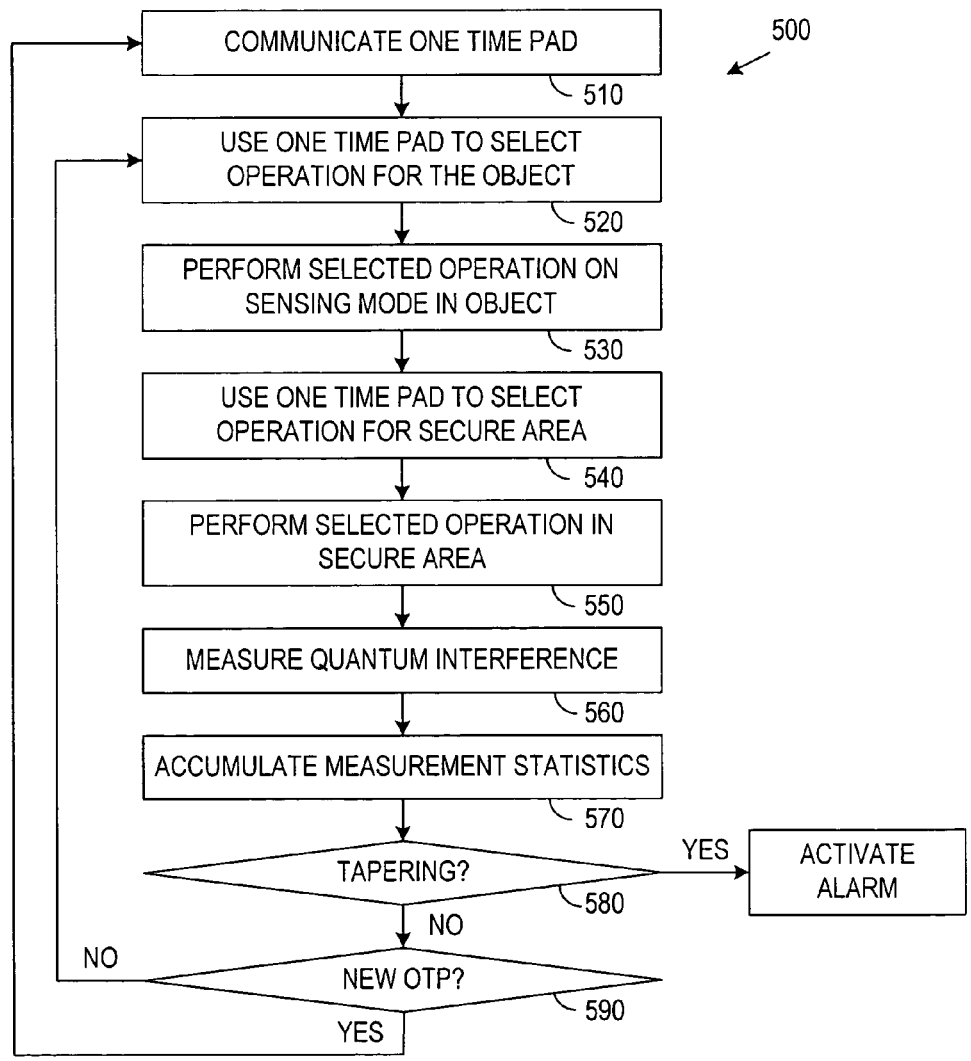
FIG. 5 is a flow diagram for a process for operating the system of FIG. 4.

FIG. 5 is a flow diagram of a process 500 that system 400 can use to monitor the security of object 410. Process 500 begins with a step 510 of communicating a one time pad between secure area 480 and object 410. For example, control system 490 can generate one time pad 496 and send a copy 416 to object 410 via secure link 440. In step 520, control logic 412 associated with object 410 uses one time pad 416 to select an operation for gate 414. When source 120 generates an entangled state, quantum gate 414 in step 530 performs the selected operation on mode 142.

In step 540, control system 490 selects an operation for quantum logic 430 and/or 435 to perform during step 550. Control system 490 has the same one time pad as control logic 412 and can therefore select operations that correspond to the operation performed by logic 414. For example, quantum logic 435 can perform the same operation that quantum gate 414 performs if matching operations will cause the states of modes 142 and 144 to coincide at state measurement system 470. Alternatively, system 490 can direct quantum logic 430 to perform the inverse of the operation that quantum gate 414 performs.

State measurement system 470 in step 560 measures the quantum interference of modes 142 and 144. The measurement result in general can depend statistically or deterministically on the operations that gates 414 and 430 perform. Step 570 accumulates measurement results from system 470, so that step 580 can detect tampering with sensing path 450. When tampering is detected, system 400 can initiate an alarm or take other action. Process 500 provides additional security against a teleportation attack because an attacker lacking the one time pad cannot reliably determine and duplicate the operation that quantum gate 414 performs. Further, a teleportation attack attempted downstream of quantum logic 414 would be difficult to complete since quantum logic 414 may change the encoding of the quantum information e.g., as a qubit, qudits, or qunat based on a physical quantity such as photon number, polarization, angular momentum or otherwise. Without such information, determining how to conduct a teleport attack is extremely difficult.

Control systems 414 and 490 can change the operations that logic 414, 430, and 435 in response to any desired timing or trigger. For example, the operations can change after each measurement, after a fixed period of time, or in response to a signal between control system 490 and control logic 412. The one time pads 416 and 496 can similarly be renewed when exhausted or in response to any desired timing or trigger. In process 500 of FIG. 5, step 590 determines whether a new one time pad is need. If so, process 500 jumps from step 590 back to step 510 for communication of a new one time pad. Otherwise, process 500 jumps from step 590 to step 520 to change the operations that gates 414 and 430 perform.

Potential vulnerability to teleportation attacks in some embodiments can be reduced or eliminated by using encryption and/or encoding of the sensing state. For example, a system can enhance security using quantum key distribution (QKD) such as described by Gisin et al., "Quantum Cryptography," Rev. Mod. Phys. 74, 145 (2002) to encode information in sensing signals.

System 400 of FIG. 4 uses a one-time pad that can be securely transmitted using QKD to permit the object to actively change a quantum state in a manner that system 470 can be detected and verify. The use of secure quantum transmission such as provided by QKD can also be used in a system in which the object actively changes classical information in a detectable manner.

Figure 6:
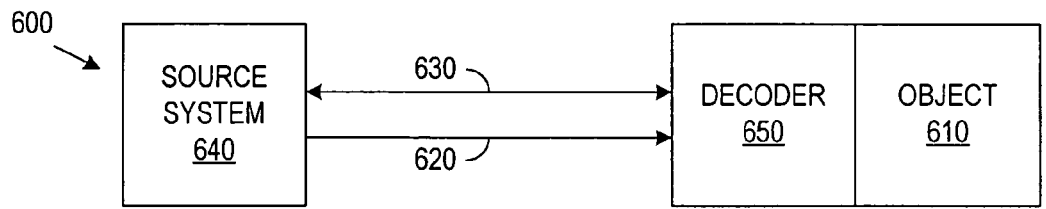
FIG. 6 shows a security system in accordance with an embodiment of the invention using quantum encryption.

FIG. 6 shows one embodiment of a security system 600 that protects an object 610 using a quantum coherent link 620 and a classical communication link 630 between a secure source 640 and a decoder 650 on object 610. Quantum coherent link 620 is an optical path that can be used for transmission of qubits encoded using alternative photonic representations. For example, a qubit can be encoded using the polarization of a photon state, and alternative encodings of the qubit can use horizontal and vertically polarized states $|H\rangle$ and $|V\rangle$ as basis states of one representation or diagonally polarized states $|H+V\rangle$ and $|H-V\rangle$ as basis states of an alternative representation. Classical communication link 630 is preferably a secure link (e.g., using one-time pad encryption or secure socket layer) that enables transmission of classical information back and forth between source system 640 and decoder 650.

Figure 7:
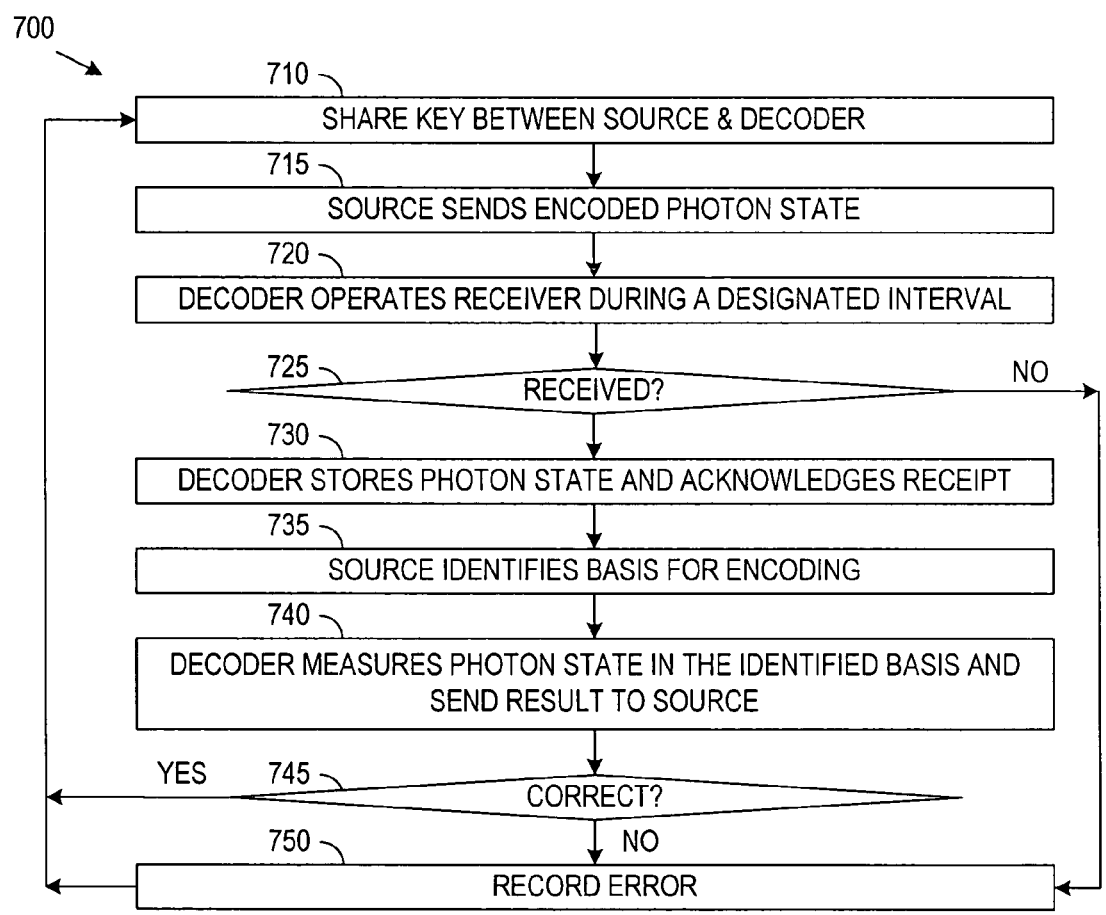
FIG. 7 is a flow diagram of a process for using the system of FIG. 6.

FIG. 7 is a flow diagram of a protocol 700 that source system 640 and decoder 650 can use to monitor the security of object 610. Protocol 700 begins with a step 710 of system 640 and decoder 650 sharing key material such as a one-time pad (OTP). This can be done via a standard QKD protocol using one quantum and one classical public channel. Source system 640 and object 610 can use authentication to stop a "man-in-the-middle" attack. System 640 in step 715 then transmits information or a message to decoder 650. In an exemplary embodiment, the message can be conveyed as a photon state representing a qubit in a randomly selected one of the possible encodings. Decoder 650 in step 720 operates a receiver during an appropriate time window for receiving the message from system 640. From a decision step 725, if the message is received during the reception window, decoder 730 stores the message, e.g., stores the photon state in a quantum coherent buffer, and classically acknowledges to system 640 that the message has been received. If an acknowledgement is not received during the reception window, step 760 records an error, which may indicate tampering. Upon receiving acknowledgement, system 640 in step 735 transmits an encrypted message to decoder 650 that with the key material identifies an encoding of the message, e.g., identifying whether photon state represents a qubit encoded using basis states $|H\rangle$ and $|V\rangle$ or basis states $|H+V\rangle$ and $|H-V\rangle$ Decoder 650 can then compose and transmit a reply message that depends on the first message and the key material. For example, in the exemplary embodiment, decoder 650 measures the stored photon in the identified basis and send the result back to system 640 via classical link 630. In decision step 745, if the reply is correct, protocol branches back to step 710 to provide additional one-time-pad data, and system 640 transmits another message, e.g., another photonic qubit. If the reply is incorrect, system 640 in step 750 records another error, and then transmits another message. System 600 using protocol 700 can detect intrusion or tampering with object 610 when the error record exceeds a predictable background level.

Processes using a one time pad and quantum encryption capabilities available in system 600 can employ alternative security processes. Examples of such processes can establish a one time pad using the techniques described above in regard to process 700, but then perform different types of quantum or classical information transmissions. For example, source system 640 could just send to object 610 a message that is encrypted using the one time pad. Object 610 (or decoder 650) can then decode, change, and re-encrypt the message and send the message back to source system 640. Source system 640 can then decrypt the message and confirm that object 610 sent the message.

In another alternative process for system 600, source system 640 could separate a produce state $|\alpha\rangle_s|\alpha\rangle_r$ and transmit one coherent state $|\alpha\rangle_r$ to object 610, where another coherent state $|\alpha\rangle_s$ is kept in the secure area and only known to source system 640. Object 610 transforms state $|\alpha\rangle_r$, e.g., changes the phase or amplitude, according to a rule based on the one time pad and sends the altered state back to source system 640. Source system 640 can then undo the transformation and put both states through a 50/50 beam splitter, so that the recombined state should entirely exit through on output port of the beam splitter. If the transmitted part was tampered with, some light from the combined state will leak to the dark port of the beam splitter, and signal that tampering occurred.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A security system comprising:
   a source capable of producing an entangled state of a sensing mode and a reference mode;
   a sensing path for the sensing mode, wherein the sensing path enters an area around an object being secured;
   a reference path for the reference mode; and
   a state measurement system capable of measuring a combination of the sensing mode after traversal of the sensing path and the reference mode after traversal of the reference path.

2. The system of claim 1, wherein the source comprises:
   a single-photon source; and
   a beam splitter in a path of a beam from the single-photon source, wherein the sensing mode and the reference mode are output modes of the beam splitter.

3. The system of claim 2, wherein the beam splitter comprises a multi-mode beam splitter that splits the beam from the single-photon source into multiple modes including the reference mode and multiple sensing modes having paths that enter the area around the object being secured.

4. The system of claim 1, wherein the source comprises a source of entangled photon pairs, each of the entangled photon pairs including a photon in the reference mode and a photon in the sensing mode.

5. The system of claim 4, wherein each of the entangled photon pairs is in a singlet Bell state.

6. The system of claim 1, wherein the sensing path consists of a first portion in a secure area and a second portion that is accessible to an intruder, wherein the second portion is straight.

7. The system of claim 6, wherein the second portion of the sensing path passes through the object.

8. The system of claim 1, wherein the reference path has an optical path length that is equal to an optical path length of the sensing path.

9. The system of claim 1, wherein the source, the reference path, and the state measurement system are within a secure area, and the sensing path extends outside of the secure area.

10. The system of claim 1, wherein the state measurement system comprises a Mach-Zehnder interferometer.

11. The system of claim 1, further comprising:
    a first quantum gate in one of the sensing path and the reference path;
    a first control circuit connected to select a first operation that the first quantum gate performs on one of the sensing mode and the reference mode
    a second quantum gate in the sensing path; and
    a second control circuit connected to select a second operation that the second quantum gate performs on the sensing mode.

12. The system of claim 11, further comprising
    a secure area containing the first control circuit, wherein the first control circuit uses a first copy of a one time pad in the secure area to select the first operation; and wherein
    the second control circuit is outside the secure area and the second control circuit uses a second copy of the one time pad to select the second operation.

13. A method for monitoring an object, comprising:
    producing an entangled state of a sensing mode and a reference mode;
    directing the sensing mode along a sensing path that enters an area around the object; and
    measuring quantum interference of the sensing mode with the reference mode to detect tampering with the sensing mode.

14. The method of claim 13, further comprising:
    transmitting information between a first system and a second system, wherein the second system is at the object;
    performing in the first system a first operation on one of the sensing mode and the reference mode before measuring the quantum interference, wherein the information identifies the first operation; and
    performing a second operation in the second system on the sensing mode, wherein the information identifies the second operation.

15. The method of claim 13, wherein the entangled state is a single-photon state.

* * * * *

UNITED STATES PATENT AND TRADEMARK OFFICE
CERTIFICATE OF CORRECTION

PATENT NO. : 7,483,142 B2  Page 1 of 1
APPLICATION NO. : 11/417614
DATED : January 27, 2009
INVENTOR(S) : Adrian Kent et al.

It is certified that error appears in the above-identified patent and that said Letters Patent is hereby corrected as shown below:

In column 3, line 64, delete "r $\tau=\Delta L/c$" and insert -- $\tau=\Delta L/c$ --, therefor.

In column 5, line 39, delete "or $|H\rangle_S |H\rangle_R + |V\rangle_S |V\rangle_R$" and insert
-- or $|H\rangle_S |V\rangle_R + |V\rangle_S |H\rangle_R$ --, therefor.

In column 5, line 43, delete "$|H\rangle_S |V\rangle_R - |V\rangle_S |H\rangle_R$" and insert -- $|H\rangle_S |H\rangle_R - |V\rangle_S |V\rangle_R$ --, therefor.

Signed and Sealed this

Fourth Day of August, 2009

JOHN DOLL
*Acting Director of the United States Patent and Trademark Office*